United States Patent [19]

Mangen et al.

[11] Patent Number: 5,137,117
[45] Date of Patent: Aug. 11, 1992

[54] LUBRICATION SYSTEM FOR A COTTON HARVESTER

[75] Inventors: Lyle P. Mangen, Wausau, Wis.; Jesse H. Orsborn, Hinsdale; Kevin S. Richman, Darien, both of Ill.

[73] Assignee: J. I. Case Company, Racine, Wis.

[21] Appl. No.: 622,502

[22] Filed: Dec. 5, 1990

[51] Int. Cl.$^5$ .............................................. F16N 27/00
[52] U.S. Cl. ...................................... 184/7.4; 184/6.1; 56/12.3
[58] Field of Search ................... 56/11.9, 12.1, 12.3, 56/28, 41, 50; 60/456; 184/6.1, 6.4, 7.4, 7.3; 417/12, 46, 47

[56] References Cited

U.S. PATENT DOCUMENTS

| | | | |
|---|---|---|---|
| 2,742,978 | 4/1956 | Peterson | 184/7.4 |
| 3,031,032 | 4/1962 | Dinkelkamp | 184/7.4 |
| 3,678,631 | 7/1972 | Payne | 184/6.4 |
| 4,520,902 | 6/1985 | Snow | 184/7.4 |
| 4,666,375 | 5/1987 | Kime | 417/46 |
| 4,769,978 | 9/1988 | Reichen et al. | 56/12.3 |
| 4,840,018 | 6/1989 | Deutsch | 56/12.3 |

FOREIGN PATENT DOCUMENTS

| | | | |
|---|---|---|---|
| 0258550 | 3/1988 | European Pat. Off. | 184/6.1 |
| 2229990 | 1/1974 | Fed. Rep. of Germany | 184/6.4 |

Primary Examiner—Allen M. Ostrager
Assistant Examiner—Alan B. Cariaso
Attorney, Agent, or Firm—Dressler, Goldsmith, Shore, Sutker & Milnamow, Ltd.

[57] ABSTRACT

The present invention relates to a lubrication system for an agricultural implement such as a cotton harvester having a plurality of harvesting units mounted thereon. Each harvesting unit of the cotton harvester includes a harvesting mechanism whose operation is facilitated by supplying lubricant thereto. The lubrication system preferably includes an on-board grease reservoir with a constant displacement pump assembly having an input connected to the reservoir and an output for providing lubricant under pressure to the harvesting mechanisms of each harvesting unit. The pump assembly is operated under the influence of a controller which operates the pump for a preselected period of time thereby causing preselected amounts of pressurized lubricant to be provided to the harvesting mechanism of each harvesting unit.

11 Claims, 4 Drawing Sheets

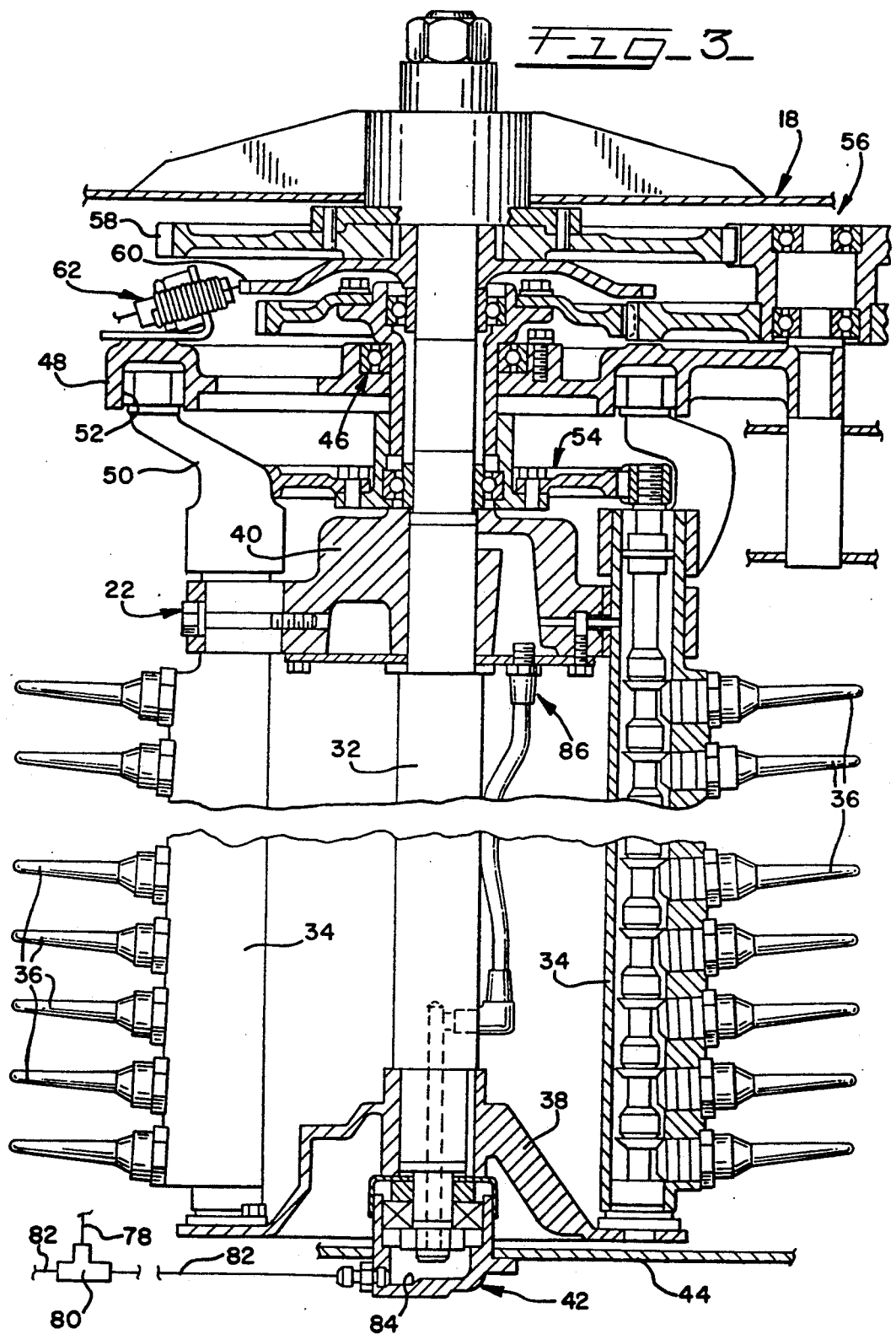

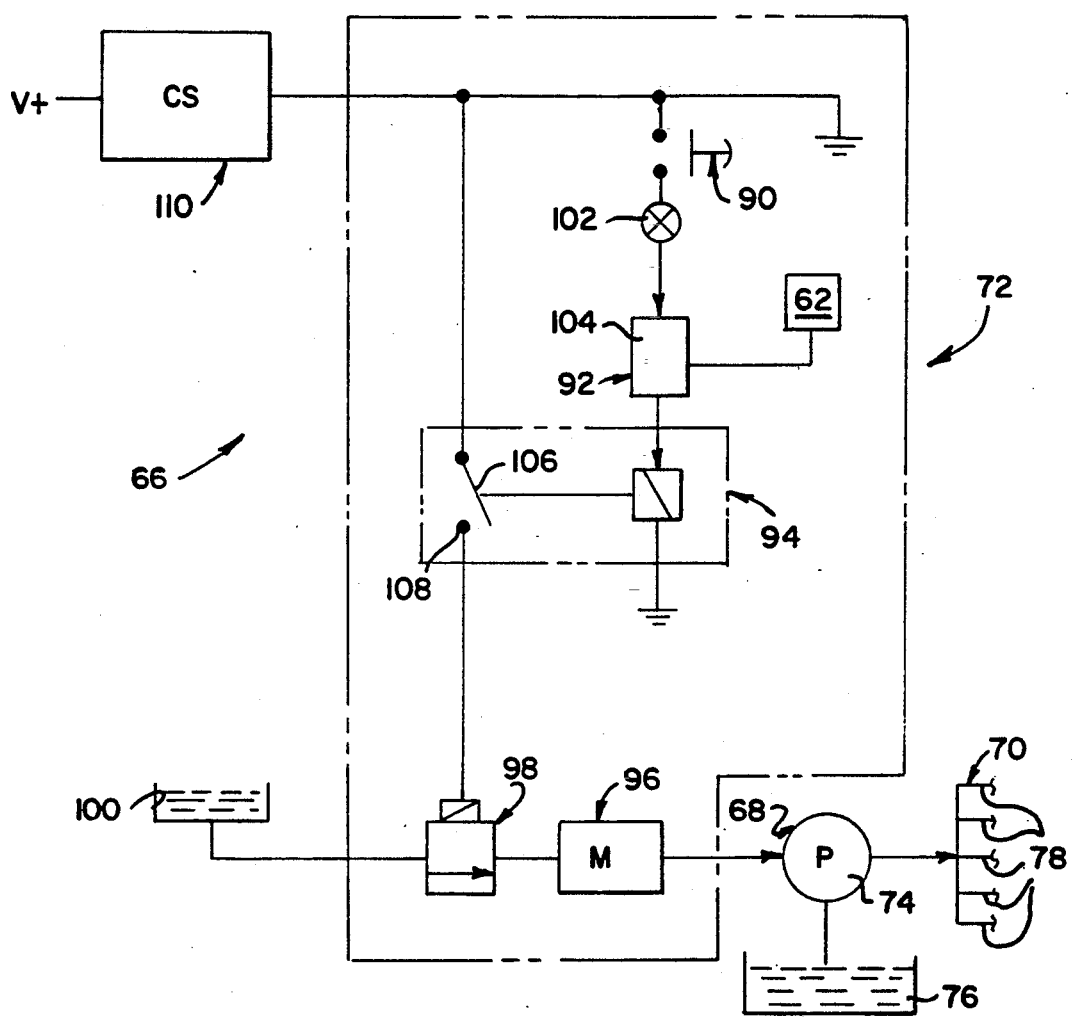

LUBRICATION SYSTEM FOR A COTTON HARVESTER

The present invention generally relates to cotton harvesters and, more particularly, to an improved lubrication system for providing proper amounts of lubricant to mechanisms arranged on harvesting units of the cotton harvester.

BACKGROUND OF THE INVENTION

A typical cotton harvester includes two or more harvesting units for harvesting cotton from rows of cotton plants. Each harvesting unit includes a rotatable harvesting mechanism typically including a pair of picker rotor assemblies with doffer assemblies arranged in combination therewith. Each picker rotor assembly includes a series of picker bars which oscillate about individual upright axes. Each picker bar has a plurality of rotatably driven picker spindles arranged thereon one above the other. A driving arrangement within the harvesting unit transmits rotary motion from an input drive shaft to the picker rotor assemblies to drive the picker bars along a predetermined path of travel while concurrently rotating the picker spindles.

Operation of the various drives for the picker rotor assembly is facilitated by frequent lubrication thereby inhibiting premature wear and failure of the component parts. As will be appreciated, proper lubrication of the harvesting unit on a daily basis can be a time consuming and laborious effort. Such effort is intensified when up to five harvesting units are supported on the harvester. Proper lubrication of the various parts is further complicated when the harvester is operated in different work cycles. As will be understood, a machine operating under a 100% duty cycle will require more lubricant than a machine operating under a 50% duty cycle. Moreover, the provision of too much lubricant in certain areas of the harvester can contaminate the spindles and harvested cotton. On the other hand, too little lubricant can reduce the life of expensive components and increase down time for the harvester.

Thus, there is a need and a desire for a lubrication system which reduces the time and effort required to lubricate a harvesting unit of a cotton harvester while providing quick and accurate amounts of lubricant to the component parts of the harvesting unit thereby reducing friction, wear, and harvester down time.

SUMMARY OF THE INVENTION

In view of the above, and in accordance with the present invention, there is provided an improved lubrication system for a cotton harvester having a plurality of harvesting units. Each harvesting unit includes a harvesting mechanism whose operation is facilitated by supplying lubricant thereto. The improved lubrication system preferably includes an onboard grease reservoir with a constant displacement gear pump having an input connected to the reservoir and an output for providing lubricant under pressure to the harvesting mechanisms of each harvesting unit. The pump is operated under the influence of a controller which operates the pump for a preselected period of time during operation of the harvester thereby causing preselected amounts of pressurized lubricant to be privided to the harvesting mechanism of each harvesting unit.

The pump outlet is preferably connected to each harvesting unit through a lubricant distribution system which directs equal amounts of lubricant to each harvesting unit. A series of common lines direct pressurized lubricant from the pump outlet to a distribution point on each harvesting unit from whence pressurized lubricant is directed to the picker rotor assemblies of each harvesting unit.

In a preferred form of the invention, the controller for controlling the pump includes a hydraulically powered motor for driving the lubricant pump. The hydraulically powered motor is preferably controlled through an electrically energizable solenoid valve. Operation of the pump is initiated through closure of a switch arranged in combination with a programmable timer mechanism. Closure of the switch activates the timer mechanism which, in turn, operates the pump for a preselected period of time thereby causing preselected amounts of lubricant to be provided to the harvesting mechanism of each harvesting unit.

To further enhance lubrication of the harvesting units, the lubrication system of the present invention can be automatically operated as a function of the amount of time the harvesting units are operated thereby automatically lubricating the harvesting units in response to the usage requirement thereof. To effect automatic lubrication of the harvesting units in response to the usage requirements thereof, the controller further includes a device for monitoring the amount of time that each of the harvesting units is operated. The monitoring device is connected to and automatically activates the timer mechanism upon expiration of a predetermined count. As such, the timer mechanism automatically operates the lubricant pump as a function of the work cycle of the harvesting units.

In a preferred form of the invention, the cotton harvester is operated in two modes of operation including a normal and a bypass or service mode of operation. In a preferred form of the invention, the controller for operating the pump is responsive to output signals provided during a service mode of operation of the harvester.

Therefore, a relatively simple and inexpensive and yet efficient and accurate lubrication system is provided for delivering pressurized lubricant to a plurality of harvesting units on a cotton harvester. By monitoring the work cycle of each harvesting unit, the lubricant flow to the harvesting units can be proportioned in accordance with the work cycle of the particular harvesting unit.

Numerous other features and advantages of the present invention will become readily apparent from the following detailed description, the accompanying drawings, and the appended claims.

DETAILED DESCRIPTION OF THE INVENTION

FIG. 3 is a longitudinal sectional view of a picker rotor assembly of a harvesting unit; and FIG. 4 is a schematic illustration of a lubrication system according to the present invention.

DETAILED DESCRIPTION OF THE INVENTION

Figure 1:
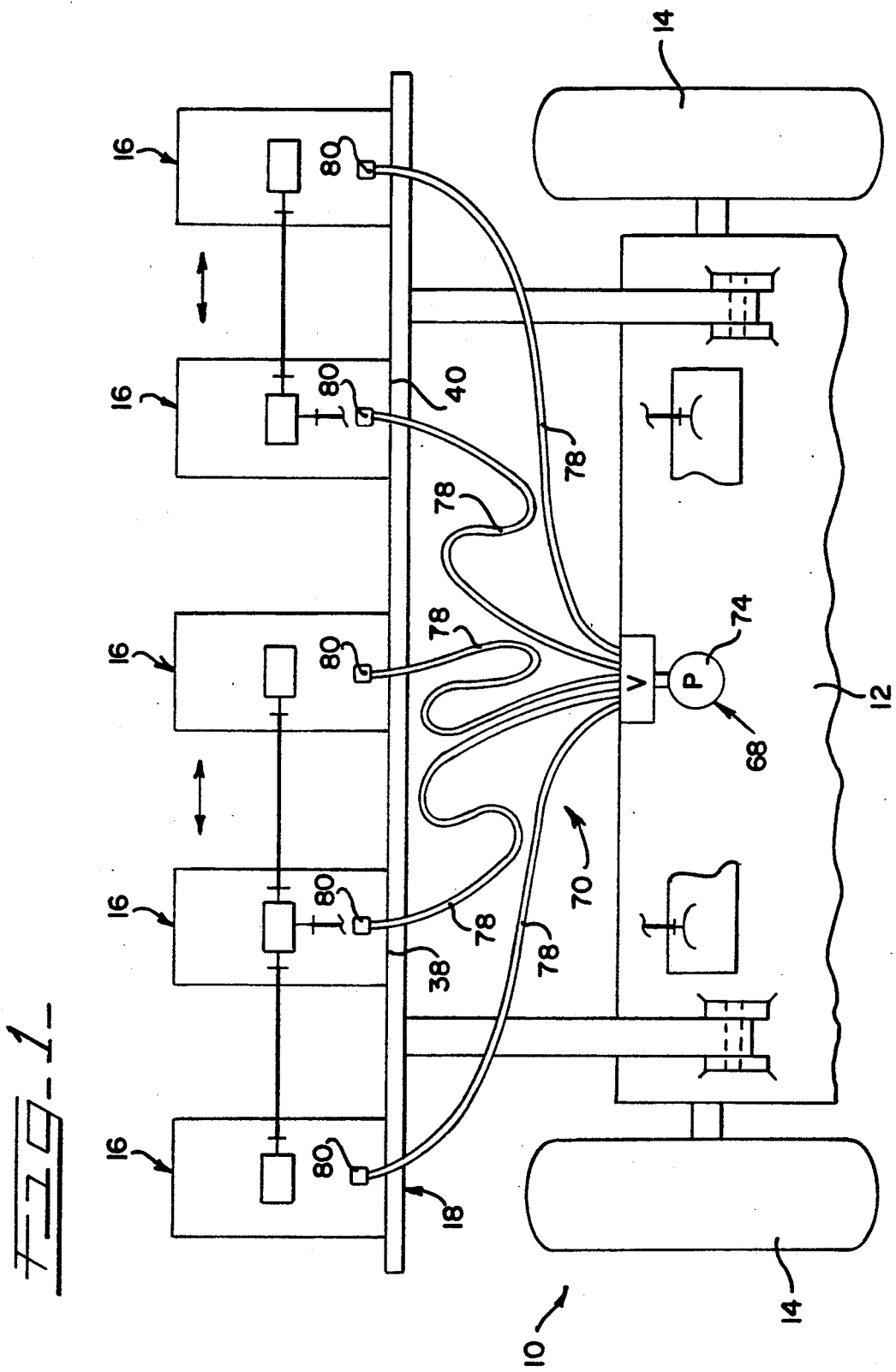
FIG. 1 is a schematic plan view of a cotton harvester incorporating a lubrication system according to the present invention.

While the present invention is susceptible of embodiment in various forms, there is shown in the drawings and will hereinafter be described a presently preferred embodiment of the invention, with the understanding that the present disclosure is to be considered as an exemplification of the invention, which is not intended to limit the invention to the specific embodiment illustrated.

Referring now to the drawings, wherein like reference numerals indicate like parts throughout the several views, there is shown a self-propelled cotton harvester which is depicted only fragmentarily and is seen as represented in its entirety in FIG. 1 by reference numeral 10. Cotton harvester 10 has a fore-and-aft extending frame 12 mounted on a pair of ground engaging front drive wheels 14 and a pair of rear steerable wheels (not shown).

Positioned forwardly on the frame are a plurality of individual cotton harvesting units 16. The harvesting units are preferably arranged side-by-side across a front end of the harvester and are laterally spaced apart a distance substantially corresponding to the distance between adjacent plant rows. The harvesting units are of generally like construction and, thus, only one harvesting unit will be described in detail, with the understanding that the other harvesting units are similarly constructed.

Figure 2:
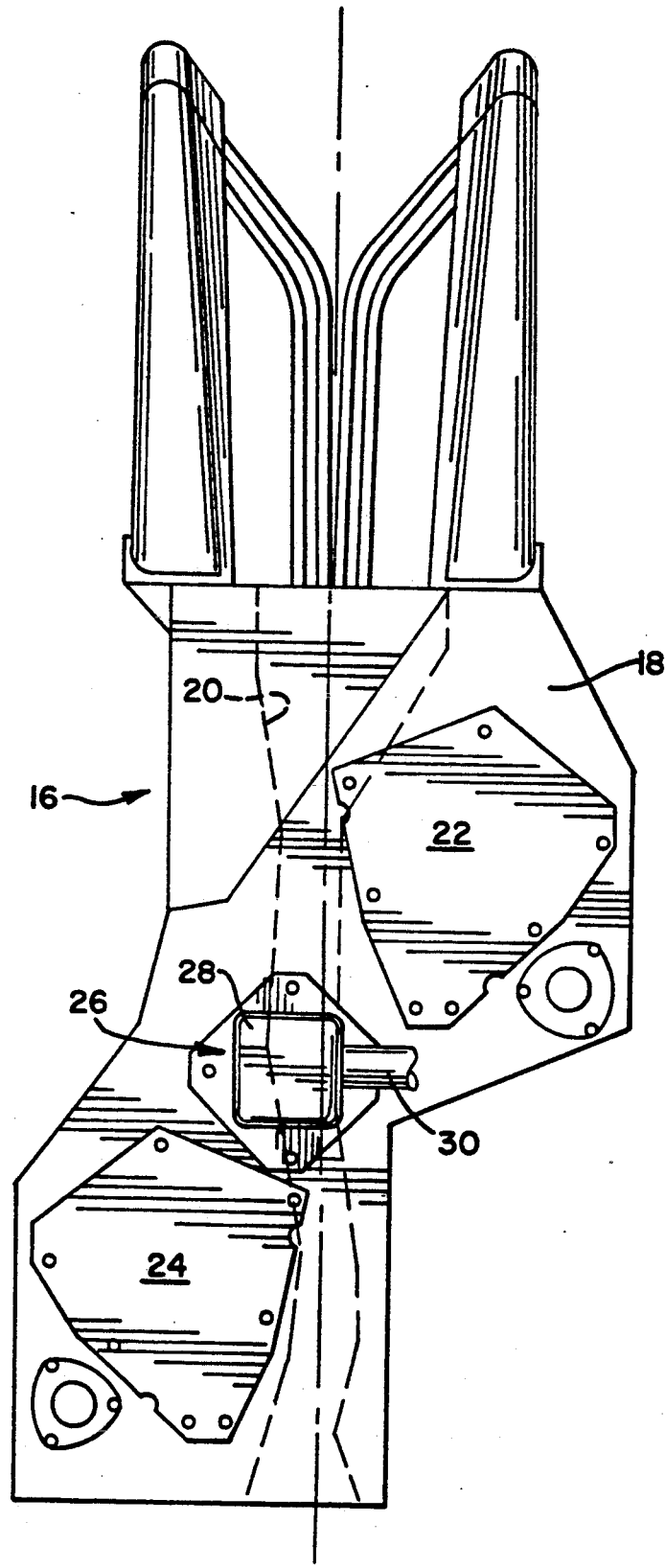
FIG. 2 is an enlarged plan view of a harvesting unit of the cotton harvester.

As illustrated in FIG. 2, each harvesting unit 16 includes a housing assembly 18 defining a fore-and-aft crop receiving opening or passage 20 which allows a plant row to pass therethrough. Each harvesting unit is further provided with a rotatable harvesting mechanism for removing cotton from a row of cotton plants passing through the harvesting unit. In the preferred embodiment, the harvesting mechanism includes front and rear picker rotor assemblies 22 and 24, respectively. Each picker rotor assembly 22, 24 is adapted to orbit along a predetermined path of travel within the housing assembly and alongside the plant passage 20. The picker rotor assemblies 22 and 24 are conjointly driven in timed relation to each other by a drive assembly 26 mounted at an upper end of the housing assembly 18 and which preferably includes a gear box 28 which is driven by a harvesting unit drive shaft 30.

The picker rotor assemblies 22 and 24 are substantially similar in construction to each other. Accordingly, only picker rotor assembly 22 will be described in detail, with the understanding that picker rotor assembly 24 is similarly constructed.

As shown in FIG. 3, each picker rotor assembly comprises an upright drive shaft 32, a plurality of upright and hollow picker bars 34 peripherally arranged about the respective rotor assembly, a plurality of vertically spaced and rotational picker spindles 36 and other rotor components.

As shown, the drive shaft 32 is provided with lower and upper support members 38 and 40, respectively, radially extending from and connected for rotation with the shaft 32. The lower support member 38 is rotatably mounted on an upstanding spindle support 42 which is suitably secured to a bottom wall 44 of the housing assembly 18. Above the upper support member 40, drive shaft 32 is rotatably supported by a bearing 46 on a stationary cam 48 which is secured to the housing assembly 18 in the usual manner.

Each picker bar 34 rotates about the axis of the drive shaft 32 and oscillates about its own vertical axis. As illustrated, opposite ends of each picker bar 34 are rotatably supported by the lower and upper support members 38 and 40, respectively. A crank arm 50 extends from the upper end of each picker bar 34. The free end of each crank arm 50 rides in a cam track 52 defined by the stationary cam 48 to move each picker bar and the picker spindles carried thereby along a predetermined path of travel as the picker rotor assembly is rotatably driven about the axis of drive shaft 32. A spindle drive mechanism 54 rotatably and individually drives the picker spindles 36 extending from the picker bars 34.

Each picker rotor assembly, including drive shaft 32, picker bars 34, and picker spindles 36, is driven by a drive mechanism 56 which derives power from the drive assembly 26. Mechanism 56 includes an input drive gear 58 arranged toward an upper end of the rotor assembly. As shown, the input drive gear 58 is rotatably mounted on a monitoring sprocket 60 which is keyed to the drive shaft 32 of the rotor assembly for rotation therewith. A sensor or monitor 62 is arranged adjacent the periphery of the monitoring sprocket 60 to monitor and measure the number of rotations of the rotor assembly.

To facilitate operation of the various mechanisms, a lubrication system is provided for supplying lubricant, such as grease, to the harvesting mechanisms. The lubrication system of the present invention, indicated generally by reference numeral 66 in FIG. 4, includes a source of pressurized lubricant 68, a lubricant distribution system 70, and a controller 72 for controlling operation of the pressurized lubricant source 68 and thereby controlling the flow of lubricant to the harvesting units 16 (FIG. 1).

As illustrated, the source of pressurized lubricant 68 includes a constant displacement gear pump 74 and a lubricant reservoir 76. Pump 74 is preferably mounted on the frame 12 (FIG. 1) of the harvester. Input port of pump 74 is connected to the grease reservoir 76 also located on the harvester preferably above the pump 74. Output port of pump 74 is connected to the lubricant distribution system 70.

The lubricant distribution system 70 distributes equal amount of lubricant from the pump 74 to corresponding lubricant receiving areas on each harvesting unit 16. The lubricant distribution system 70 preferably includes a series of common lines 78 extending from the outlet port of the pump to each harvesting unit. As shown in FIG. 3, at each harvesting unit, the common line 78 leading thereto is connected to a T-fitting 80 carried on the housing assembly 18. Conduits 82 extend from the T-fitting 80 to the front and rear picker rotor assemblies 22 and 24, respectively, of each harvesting unit.

In the preferred embodiment, the spindle support 42 at the lower end of each picker rotor assembly defines a lubricant receiving chamber 84 which is connected to and receives lubricant from a conduit 82. In the illustrated embodiment, lubricant passes from the chamber 84 through a spindle lubrication system 86. The details of the spindle lubrication system are fully set forth in U.S. Pat. No. 4,972,663 and entitled "COTTON PICKER SPINDLE LUBRICATION SYSTEM." Therefore, the details of the spindle lubrication system will not be set forth herein.

Returning to FIG. 4, the controller 72 controls operation of the pressurized lubricant source 68 and thereby automatically regulates the flow of lubricant provided to the harvesting units. The controller 72 is connected to a source of power such as the battery of the harvester. As shown, the controller 72 includes a switch 90 which supplies power to a timer mechanism 92 that operates a latching relay 94. The controller 72 also includes a hydraulically powered motor 96 which is used to drive the pressurized lubricant source 68. Operation of motor 96 is regulated by an electrically energizable mechanism such as a solenoid valve 98 which is responsive to operation of the latching relay 94. As shown, the solenoid valve 98 controls the supply of hydraulic fluid from a hydraulic system on the harvester and including a hydraulic reservoir 100 mounted on the harvester frame.

In a preferred form of the invention, the switch 90 is located in the cab region (not shown) of the harvester and is selectably positionable in either a "Manual" or an "Automatic" position. In its manual position, switch 90 acts as a momentary contact switch which activates the lubricant source 68 for a predetermined period of time. In its automatic position, switch 90 is releasably held in a position to automatically actuate the lubricant source 68. An indicator lamp 102 can be connected to the switch 90 to provide a visual indication of activation of the lubrication system.

As shown, the timer mechanism 92 includes a programmable or adjustable solid state timer 104 which operates the pressurized lubricant source for a predetermined period of time upon activation thereof as through closure of switch 90. When switch 90 is in its "Automatic" position, timer 104 is automatically activated in response to operational time of the harvesting mechanism of the harvesting units. As shown, sensor 62 is connected to the timer 104. The sensor 62 includes counter circuitry for monitoring the amount of time that the harvesting unit operates. After the sensor 62 counts or monitors that the harvesting unit has been operated for a predetermined period of time, the timer 104 will automatically operate the pressurized lubricant source 68 for a predetermined period of time. In a preferred form of the invention, the timer activates the lubrication system for the same amount of time whether operated manually or automatically. Notably, after the lubrication system has been activated manually, the counter circuitry associated with sensor 62 is reset.

The latching relay 94 is connected and operates in response to output signals generated by the timer mechanism 92. As illustrated, the latching relay 94 includes a movable contact 106 connected to the voltage source and a normally open contact 108 connected to the solenoid valve 98.

The cotton harvester is preferably operated under the influence of a control system generally designated by reference numeral 110 in FIG. 4. The control system 110 may be similar to that disclosed in U.S. Pat. No. 5,025,614 and entitled "CONTROL SYSTEM FOR A COTTON HARVESTER." As explained in detail therein, the control system 110 operates the harvesting units of the cotton harvester in a "operation" mode used during normal harvesting conditions and selectively allows operation of the harvesting units in a "bypass" mode when the operator is away from the operator station and the harvesting units are operated within a predetermined speed range.

As shown in FIG. 4, the controller 72 of the lubrication system is preferably connected to an output of the control system 110. As such, the lubrication system is automatically enabled during normal harvesting conditions and is selectively enabled during the bypass mode of operation of the harvester.

During normal operation of the harvester, the pressurized source of lubricant 68 is inoperative to provide lubricant to the harvesting units 16 of the cotton harvester. To provide a supply of lubricant to the harvesting unit 16, the operator activates the controller 72. More specifically, the operator selectively activates the switch 90 which supplies power to the timer mechanism 92. When in a "Manual" mode, closure of switch 90 activates the timer mechanism 92 for a programmable or adjustable period of time. When switch 90 is in an "Automatic" mode, timer mechanism 92 is automatically activated for a preset time period in response to the harvesting units being rotated for a predetermined number of revolutions as monitored by sensor 62. Activation of the timer mechanism energizes relay 94 thereby causing the movable contact 106 to close the normally open contact 108. Closure of contact 108 completes a circuit from the voltage source to the solenoid valve 98 controlling the hydraulic supply to the motor 96. Activation of the motor 96 causes the pump 74 of the pressurized lubricant source 68 to move lubricant from the reservoir 76 to the lubricant distribution system 70 and, ultimately, to the picker rotor assemblies 22 and 24 of each harvesting unit.

It may be desirable to lubricate the harvesting units 16 other than during normal harvesting conditions. To effect such ends, the controller 72 of the lubrication system of the present invention is connected to the control system 110 allowing activation of the pressurized lubricant source 68 during a "bypass" mode of operation of the harvester.

As will be appreciated, the amount of total flow of lubricant from the lubricant pressurized source 68 is regulated by the time value set on the timer mechanism 92. This time is adjustable and/or programmable allowing for use in harvesters having different harvesting unit configurations. This also allows the operator to adjust the operation time for the pressurized source of lubricant thus compensating for flow differences due to temperature or individual lubrication practices.

The lubrication system of the present invention provides a simple and effective mechanism for automatically providing appropriate quantities of lubricant to each of the harvesting units thereby facilitating operation of the component parts thereof. Moreover, the lubrication system of the present invention eliminates the need for manual lubrication of the spindle drives and reduces the time involved in lubricating the harvesting units. Furthermore, the lubrication system of the present invention eliminates human error by providing proper amounts of lubricant to each of the harvesting units as a function of the time period set on the timer mechanism 92.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A lubrication system for a cotton harvester having a plurality of harvesting units, each harvesting unit including a rotatable harvesting mechanism, which is selectively operated for a duty cycle during a harvesting procedure of the cotton harvester, said lubrication system comprising:
- a lubricant reservoir;
- a lubricant pump having an input connected to the reservoir and an output for simultaneously providing lubricant under pressure to the harvesting mechanism of each harvesting unit; and
- control means for causing preselected amounts of pressurized lubricant to be provided to the harvesting mechanism of each harvesting unit, said control means including sensor means for measuring cyclic operation of said harvesting mechanism during operation of the cotton harvester and operative means arranged in combination with he sensor means for enabling operation of said pump for a preselected period of time so as to cause the amount of lubricant provided to said harvesting mechanism to be correlated to lubricant usage requirements of the harvesting mechanism during cyclic operation thereof.

2. The lubrication system according to claim 1 wherein said operative means of said control means includes a programmable timer which sets the preselected period of time for pump operation.

3. The lubrication system according to claim 1 further including a lubricant distribution system connected to an outlet of said pump and each of said harvesting units for distributing equal amounts of lubricant to each harvesting unit.

4. The lubrication system according to claim 1 wherein said pump is a gear pump and said control means includes a hydraulically powered motor for driving said pump.

5. The lubrication system according to claim 4 wherein said control means further includes electrically energizable means for controlling operation of said hydraulically powered motor.

6. The lubrication system according to claim 1 wherein said control means further includes a switch connected to a power source for selectively controlling operation of said pump.

7. A lubrication system for a cotton harvester having a plurality of harvesting units mounted thereon and which are operable in operational and service modes of operation under the influence of a control system, each harvesting unit including at least two upright picker rotor assemblies which are conjointly operated for a duty cycle of varying duration, each picker rotor assembly having a plurality of picker spindles vertically arranged on picker bars which oscillate about individual upright axes, and with a lubricant receiving cavity located at a lower end of each rotor assembly, said lubrication system comprising:
- a lubricant reservoir;
- a constant displacement pump having an input connected to said reservoir and an output connected to a lubricant distribution system which simultaneously delivers the amounts of lubricant to corresponding lubricant receiving areas on each picker rotor assembly; and
- control means for controlling operation of said pump, said control means including first operative means for measuring cyclic operation of said harvesting units during harvesting operations of the cotton harvester and for automatically operating said pump for a predetermined period of time during the harvesting units operational mode such that the lubricant provided to the harvesting units is correlated to lubricant usage requirements of the picker rotor assemblies during cyclic operation thereof, said control means further including second operative means for selectively actuating said pump during a service mode of operation of the harvesting units and for a preselected period of time thereby distributing preselected amounts of lubricant to the lubricant distribution system.

8. The lubricant system according to claim 7 wherein said control means includes timer means for regulating operation of said pump to predetermined time periods controlled by said timer means.

9. The lubricant system according to claim 8, wherein said control means further includes counter circuitry for counting revolutions of a picker rotor assembly and automatically enabling said pump as a function of the number of revolutions of the respective picker rotor assembly.

10. The lubrication system according to claim 9 wherein said counter circuitry is automatically reset upon said pump being enabled.

11. The lubrication system according to claim 1 wherein said sensor means is mounted on each harvesting unit for measuring rotations of said harvesting mechanism about a fixed rotational axis and for producing an output signal indicative of cyclic operation of the harvesting mechanism.

* * * * *